United States Patent [19]

Chambers

[11] 4,361,858
[45] Nov. 30, 1982

[54] METHOD AND APPARATUS FOR SELECTING ELEMENTS

[75] Inventor: William I. Chambers, Wichita, Kans.

[73] Assignee: NCR Corporation, Dayton, Ohio

[21] Appl. No.: 180,220

[22] Filed: Aug. 22, 1980

[51] Int. Cl.³ .................. G11B 15/68; G11B 23/04
[52] U.S. Cl. ................................ 360/92; 360/71
[58] Field of Search ............ 360/92, 91, 71, 74.1, 360/74.5, 132; 242/197–200

[56] References Cited

U.S. PATENT DOCUMENTS

| | | | |
|---|---|---|---|
| 3,378,827 | 4/1968 | Hertrich | 360/92 |
| 3,710,477 | 1/1973 | Frawley | 29/203 B |
| 3,743,090 | 7/1973 | Brown et al. | 209/74 |
| 3,747,754 | 7/1973 | Nix et al. | 209/80.5 |
| 3,800,942 | 4/1974 | Hirata et al. | 209/80.5 |
| 3,872,506 | 3/1975 | Staar | 360/92 |
| 4,050,751 | 9/1977 | Stange | 312/197 |
| 4,063,294 | 12/1977 | Burkhart | 360/92 |
| 4,075,669 | 2/1978 | Louzil et al. | 360/92 |

Primary Examiner—John H. Wolff
Attorney, Agent, or Firm—J. T. Cavender; Albert L. Sessler, Jr.; Elmer Wargo

[57] ABSTRACT

A method and apparatus for selecting one of a plurality of elements such as tape cassettes. The apparatus includes an entrance area in a stationary member and transport apparatus for moving the elements in first and second directions with respect to the entrance area, the transport apparatus including rotor and chain embodiments. A diverter gate is used to divert an element away from and into the entrance area when the transport apparatus is moving, respectively, in the first and second directions with respect to the entrance area. Position sensing is used to determine which one of the plurality of elements is located at a predetermined location with respect to the entrance area. A selected element is brought into cooperative engagement with a read/write device located in the entrance area.

18 Claims, 15 Drawing Figures

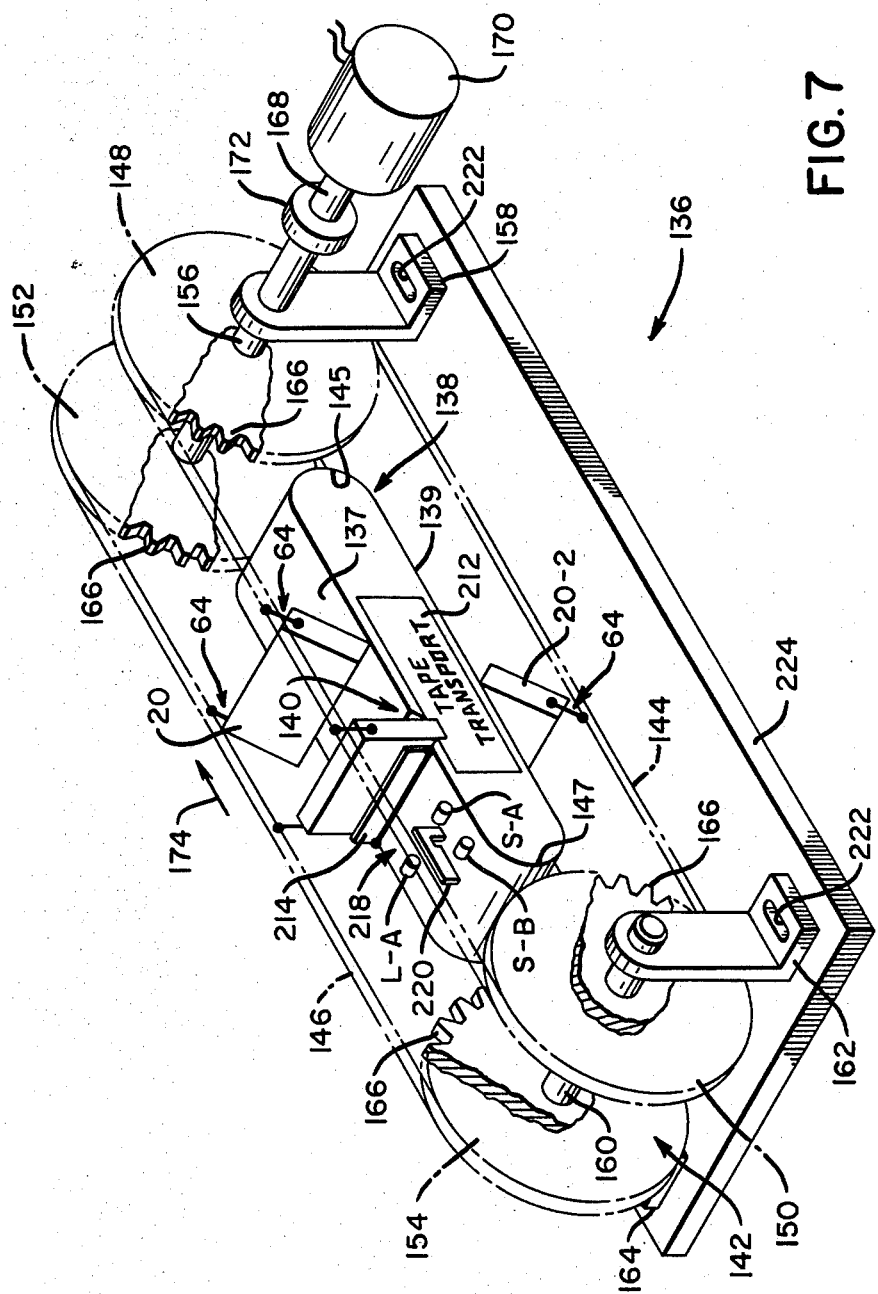

METHOD AND APPARATUS FOR SELECTING ELEMENTS

BACKGROUND OF THE INVENTION

This invention relates to a method and apparatus for selecting one of a plurality of elements and is especially useful in providing a low-cost, storage apparatus for use in data processing systems.

Certain large storage apparatuses which are used in data processing systems utilize data cartridges which are stored along X and Y coordinates in a storage rack. Complicated selector mechanisms are required to select a desired cartridge from the storage rack and to transfer it into operative engagement with an associated read/write mechanism.

SUMMARY OF THE INVENTION

This invention relates to a method and apparatus for selecting one of a plurality of elements, with the apparatus including a stationary means having an entrance area for receiving a selected element. Moving means are also included for moving the elements in a first direction towards the entrance area so as to successively present the elements to the entrance area for selection. A diverter means is located at the entrance area to enable the elements to pass over the entrance area when travelling in the first direction; however, when a selected element is moved in a second direction which is opposite to the first direction, the diverter means facilitates the entry of the selected element into the entrance area. A sensing or selecting means is used to select an element which is to be moved in said second direction into said entrance area.

The method and apparatus of this invention are inexpensive and simple to implement.

The method and apparatus of this invention are especially useful in providing a low-cost, storage apparatus which makes use of a low-cost data cartridge which is gaining popularity in use.

These advantages and others will become more readily understood in connection with the following specification, claims and drawing.

BRIEF DESCRIPTION OF THE DRAWING

FIG. 7 is a general schematic view, in perspective, of a second embodiment of this invention;

DETAILED DESCRIPTION OF THE INVENTION

Figure 1:
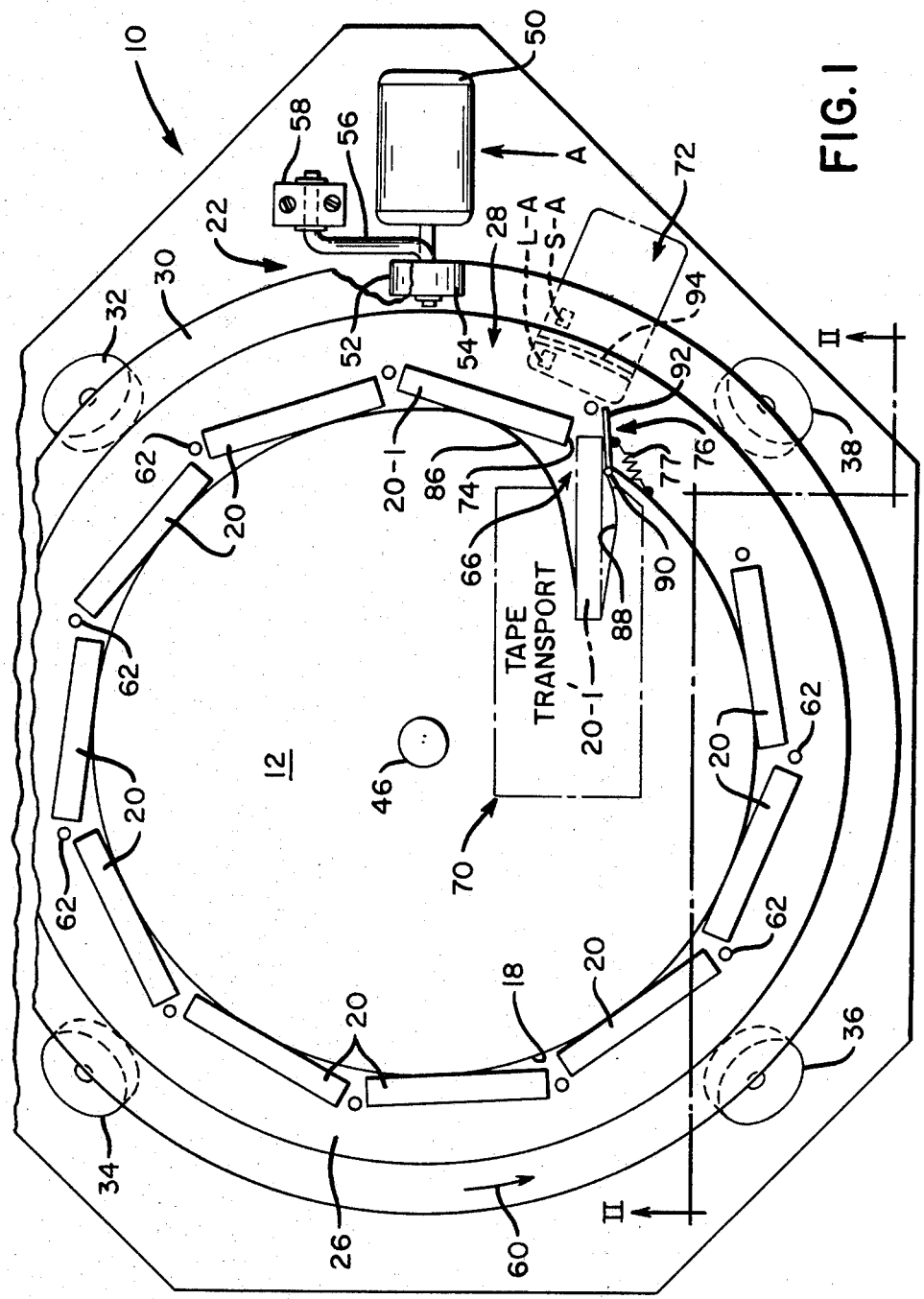
FIG. 1 is a plan view of one embodiment of the apparatus of this invention in which the selection apparatus thereof may be used to provide a low-cost storage device in which the apparatus of this invention is used to select data storage elements such as tape cassettes; the cassettes are moved in a general circular pattern in a first direction by a moving means including a reversible motor; a cassette is shown being moved past a blocking means into an entrance or selection area in a stationary member where the selected cassette will coact with a cassette player or tape transport.
Figure 2:
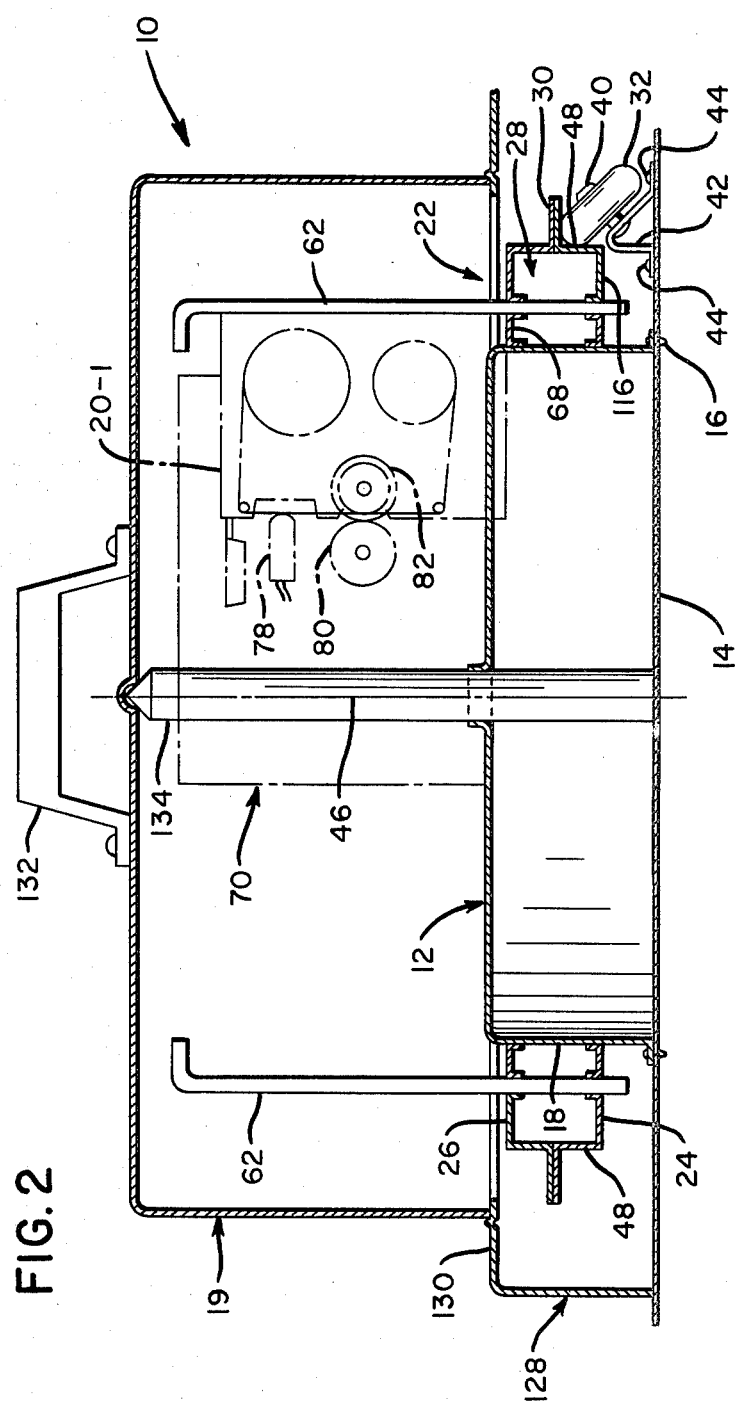
FIG. 2 is a side view, in elevation of the apparatus shown in FIG. 1, with a portion of an associated cover being removed to show more details of the means for moving the cassettes in a general circular pattern.

FIGS. 1 and 2 show a first embodiment of the apparatus of this invention which is designated generally as 10 which, in a preferred form, is used in a low-cost, data storage system.

The apparatus 10 (FIGS. 1 and 2) includes a stationary means such as a cylindrical base designated generally as 12 which is fastened to a planar base 14 by fasteners 16 (FIG. 2) and is upstanding therefrom to provide a general cylindrical wall 18.

A cover 19, shown in FIG. 2, is removed in FIG. 1 to facilitate a showing of the elements which are selected by the apparatus 10, which elements are shown as tape cassettes 20 which are moved in circular directions around the cylindrical wall 18 by a moving means designated generally as 22.

The moving means 22 (FIGS. 1 and 2) includes first and second sections 24 and 26 which are shaped in cross section as shown in FIG. 2 and conventionally secured together as by welding to provide a general torus-shaped element or rotor 28 which has a peripheral flange 30 extending therefrom to provide a driving peripheral area on the underside (as viewed in FIG. 2) of the flange 30.

The rotor 28 is mounted in the apparatus 10 (FIG. 2) so that it is rotatable around the cylindrical base 12. The rotor 28 is rotably supported by four identical resilient wheels 32, 34, 36 and 38 as shown in FIG. 1; however, wheel 32 is displaced slightly in FIG. 2 from its actual position shown in FIG. 1 so as to facilitate an explanation thereof. Wheel 32 is rotatably supported on an axle 40 which is fixed to a bracket 42 which orients the axle 40 at an angle of 45 degrees with respect to the planar base 14. The bracket 42 is adjustably fixed to the planar base 14 by fasteners 44 which are positioned in radially aligned slots (not shown) with respect to the longitudinal axis 46 of the circular base 12 so as to enable the brackets 42 of each of the wheels 32, 34, 36 and 38 to be adjustably moved radially inwardly or outwardly so as to position the rotor 28 so that its longitudinal axis is coincident with the longitudinal axis 46, thereby enabling the rotor 28 to be rotated around the cylindrical base 12. As best seen in FIG. 2, each of the wheels 32, 34, 36, and 38 has a circular periphery like that shown for wheel 32, and is aligned at a 45 degree angle with respect to the planar base 14 so as to engage a portion of the underside of flange 30 and a portion of the side wall 48 of section 24 to thereby rotably support the rotor 28 for rotation around the cylindrical base 12.

Figure 4:
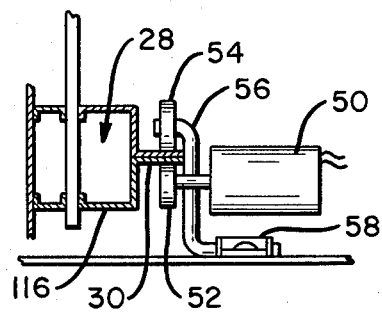
FIG. 4 is a side view, in elevation, of a portion of the means for moving the cassettes as seen from the direction A of FIG. 1.

The moving means 22 (FIGS. 1 and 2) also includes a reversible motor 50 having a driving roller 52 being operatively coupled thereto as is best shown in FIG. 4. The driving roller 52 is positioned so as to engage the underside of the flange 30 in driving engagement therewith. A back-up or pinch roller 54 engages the upper side of the flange 30 (as viewed in FIG. 4) in aligned relationship with the drive roller 52 so as to enable the drive roller 52 to provide a positive drive to the rotor 28. The pinch roller 54 is rotatably mounted on one end of a generally "Z"-shaped rod 56 whose remaining end is pivotally mounted in a base portion 58 which contains a torsion spring (not shown) which is tensioned to bias the rod 56 in a direction which resiliently biases the pinch roller 54 towards the opposed drive roller 52 to provide a positive drive between the drive roller 52 and the rotor 28.

When the motor 50 (FIG. 1) is energized, it rotates the rotor 28 in a first or counter-clockwise direction as viewed in FIG. 1 and as represented by arrow 60. When the energizing current to the motor 50 is reversed, the rotor 28 moves or rotates in a second direction which is opposite to the direction of arrow 60.

Figure 9:
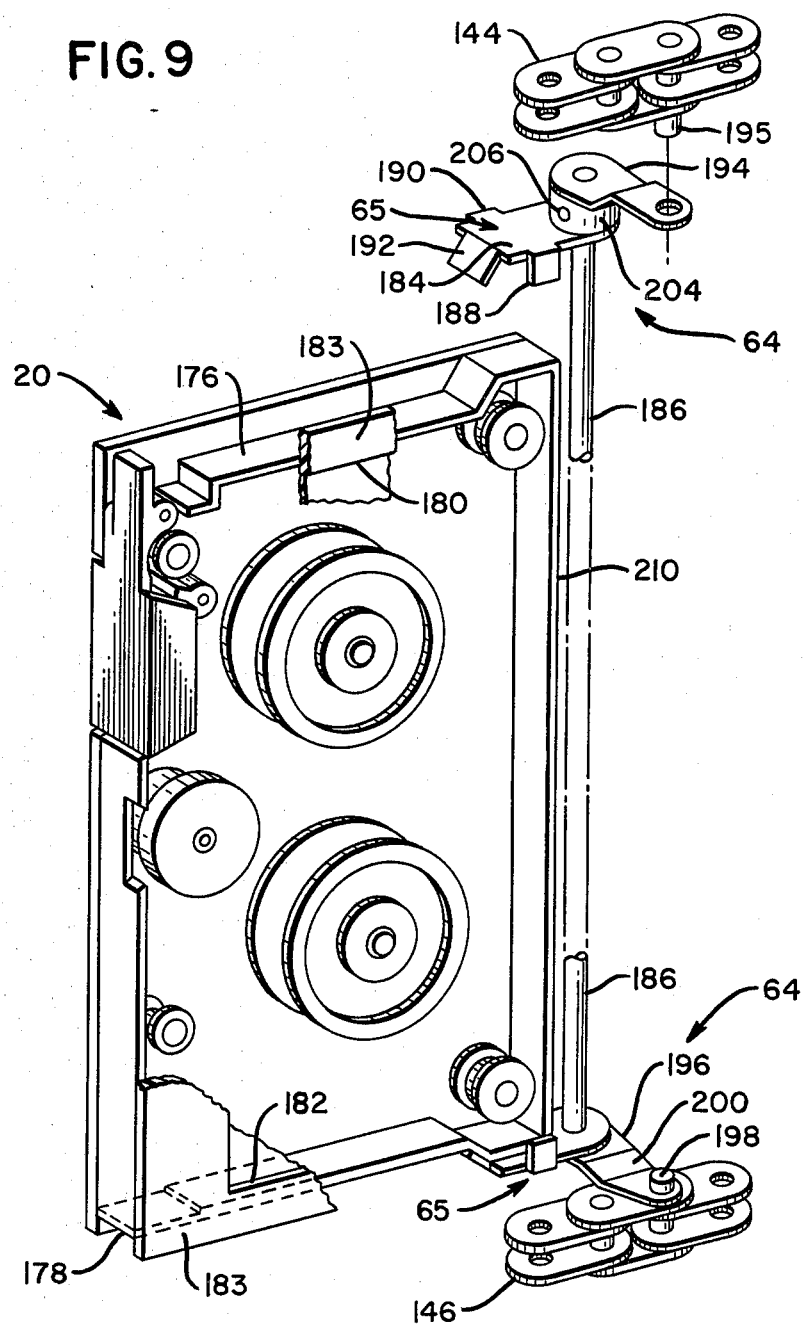
FIG. 9 is a general perspective view of the attachment means used for securing a cassette to its associated moving means.

In the apparatus 10, the elements which are selected by the apparatus are the cassettes 20 as are best shown in FIG. 1. Each cassette 20 is pivotally and detachably secured to an associated guide 62 by a suitable attachment means including a clip 65, as shown in FIG. 9, for example. The attachment means 64 (FIG. 9) are conventional and are designed for the particular elements such as the cassettes 20 which are to be selected by the apparatus 10. The attachment means including the clip 65 are not shown in FIG. 1 in order to simplify the drawing; however, at this point in the discussion, it is sufficient to state that each cassette 20 is pivotally attached to an associated guide 62 and biased by the attachment means to pivot in a clockwise direction (as viewed in FIG. 1) with regard to guide 62 and slide against the cylindrical wall 18 as the rotor 28 is moved in the direction of arrow 60 to present successive cassettes 20 to a selection area 66 in the cylindrical base 12. As seen in FIG. 2, the guides 62 are positioned vertically and are conventionally secured to the rotor 28, and the associated cassette like 20-1 rests on a portion 68 of the rotor 28. The entrance area 66 (FIG. 1) has a depth which enables a cassette like 20-1 to be moved therein when the rotor 28 is moved in a clockwise direction as viewed in FIG. 1.

The method of selecting a particular cassette like 20 to be played on a tape transport 70 is best described in connection with FIG. 1. The rotor 28 is rotated in a forward direction or in the direction of arrow 60 so as to present successive ones of the cassettes like 20 to the selection area 66. A position sensor 72 (to be described in detail hereinafter) is used to select the particular cassette like 20 to be played on the tape transport 70. Assume for the moment that cassette 20-1 shown in solid outline in FIG. 1 is the cassette to be selected. For the selection, the cassette 20-1 is moved past the selection area 66 by the rotor 28 to the position shown in solid outline, and the current to the motor 50 is reversed causing the rotor 28 to be rotated in a clockwise direction as viewed in FIG. 1 or the reverse of that indicated by arrow 60. As the cassette 20-1 is moved in a clockwise direction, the end 74 of cassette 20-1 contacts a diverter gate 76 which diverts the end 74 into the selection area 66. As the rotor 28 continues to rotate in a reverse or clock-wise direction, the cassette 20-1 is moved into the tape transport 70 and assumes the position shown by the dashed outline 20-1'.

Figure 3:
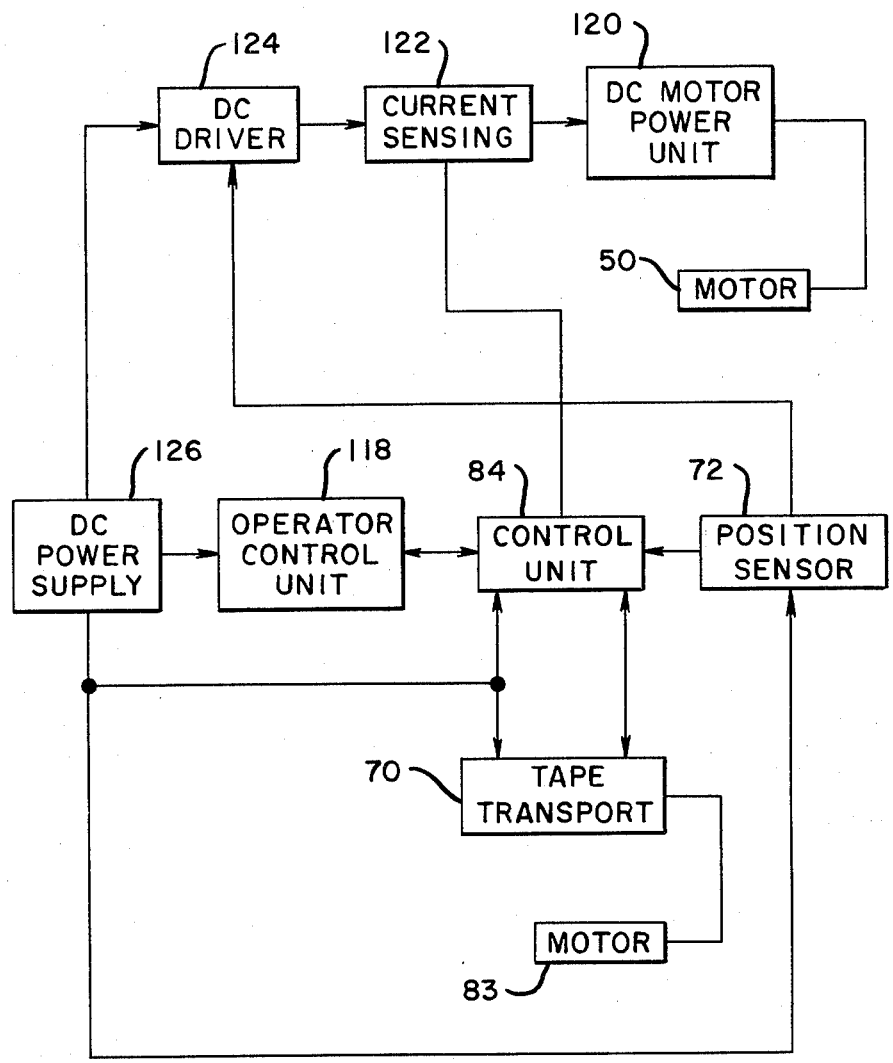
FIG. 3 is a schematic block diagram of a means for controlling the operation of the apparatus of this invention.

When the cassette 20-1 is in the position shown by the dashed outline 20-1' in FIG. 2, a read/write head 78 (associated with the transport 70) engages a magnetic tape in the cassette in operative relationship therewith, and a capstan 80 also associated with the transport 70 engages a pulley 82 within the cassette. The pulley 82 moves the tape (not shown) in operative relationship with the read/write head 78 as is conventionally done to read or write data out of/into the selected cassette 20-1. The transport 70 has a motor 83 (FIG. 3) for conventionally driving the capstan 80 under the control of the control unit 84 (FIG. 3). After the use of the cassette 20-1 is completed, the motor 50 is energized to rotate the rotor 28 in the direction of arrow 60 to pull the cassette 20-1 out of the transport 70 (shown by dashed outline 20-1') whereby it assumes the position of cassette 20-1 (FIG. 1) and the rotor 28 is further rotated util the next cassette 20 is selected as previously explained.

The selection area 66 has an arcuately-shaped convex shoulder 86 (FIG. 1) on one side of the area 66 and an arcuately-shaped, concave shoulder 88 on the opposite side of the area 66 so as to facilitate the pivoting and entering of a cassette 20 into the tape transport 70. The actual curvatures of the shoulders 86 and 88 are determined by conventional geometric principles so as to enable the particular cassette used (like 20) to slidably move into operative relationship with the tape transport 70. The opening into the tape transport 70 also has the same curvature as the shoulders 86 and 88. It should be noted that the selected cassettes 20 are positively driven into engagement with the tape transport 70.

The diverter gate 76 (FIG. 1) has one end 90 pivotally secured to the shoulder 88 and the free end 92 thereof is resiliently biased by a resilient torsion spring 77 (shown as a tension spring for ease of illustration) to the position shown in FIG. 1 where it abuts against a stop (not shown). In this position, the diverter gate 76 facilitates guiding a cassette like 20-1 into the selection area 66 when the rotor 28 is moved in a direction which is opposite to the direction of arrow 60. Because the diverter gate 76 is resiliently biased, it is resiliently rotated about its end 90 in a counterclockwise (as viewed in FIG. 1) by a cassette 20 approaching the diverter 76 when coming from the direction of arrow 60.

Figure 5:
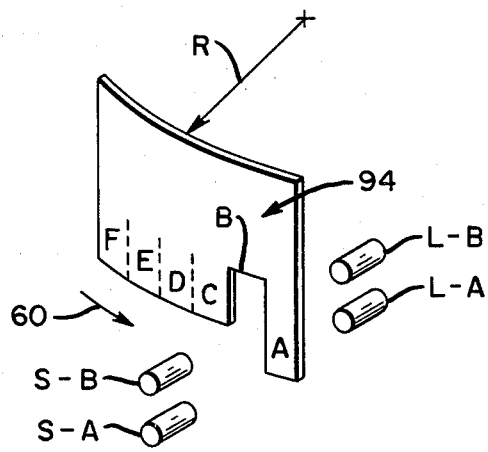
FIG. 5 is a general diagrammatic view of a position sensor plate used as part of a means for selecting the particular cassette to be loaded into the tape transport shown in FIG. 1.
Figure 6:
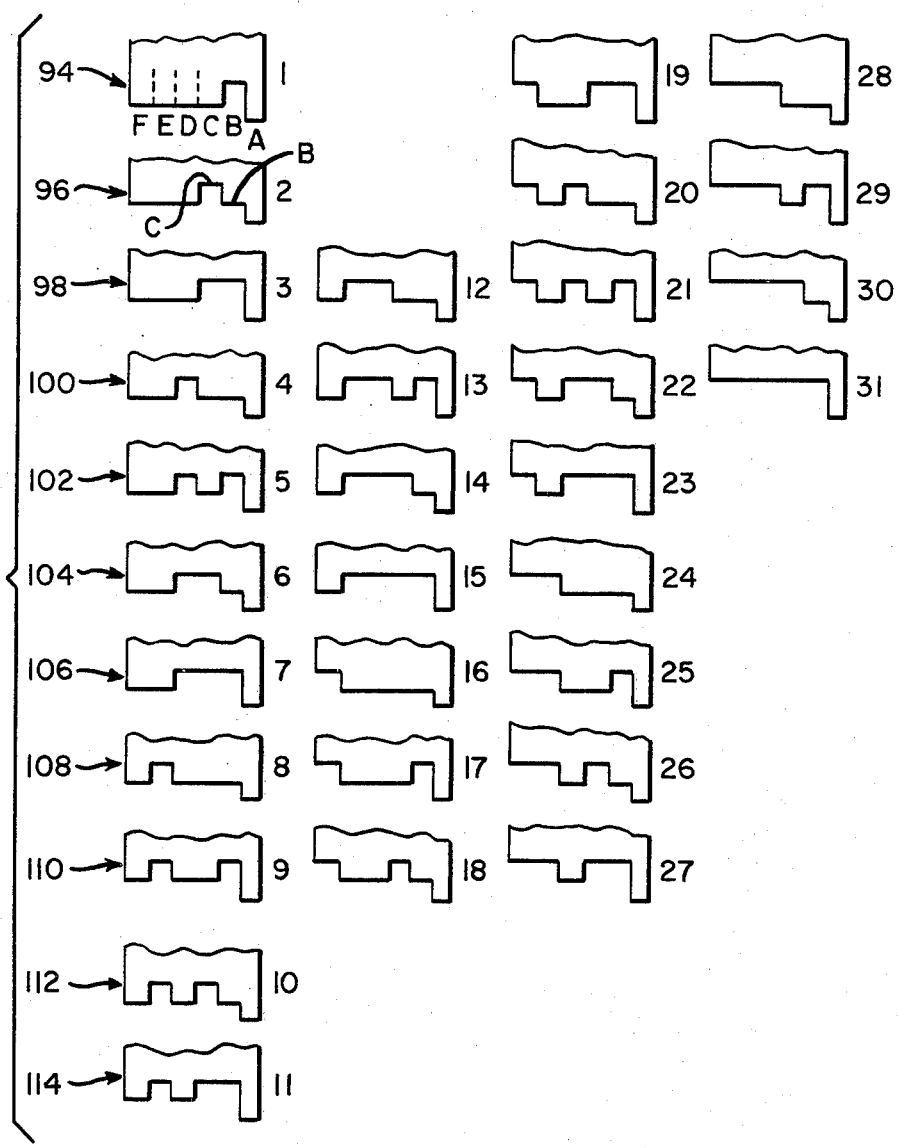
FIG. 6 shows details of position sensor plates associated with each of the cassette positions shown in FIG. 1.

The position sensor 72, shown only in block form in FIG. 1, includes a sensor plate which is generally similar to plate 94 shown in FIG. 5. The sensor plate 94 is part of a means for selecting the particular cassette 20 which is to be loaded into the tape transport 70. In the embodiment shown in FIG. 1, there are eleven cassettes 20 mounted on the rotor 28, although, obviously, this number can be changed to suit particular applications; consequently, for this embodiment, there are 11 sensor plates 94, 96, 98, 100, 102, 104, 106, 108, 110, 112, and 114 as best shown in FIG. 6. Each of the plates 94-114 includes an identical segment A which is longer than the rest of the notches or segments at positions B, C, D, E, and F associated therewith. The numbers (1–11) to the right of the plates 94–114 shown in FIG. 6 represent the numerical equivalent of the binary coding effected by the presence or absence of segments at positions B, C, D, E, and F. For example, a notch is present at position B for plate 94 (FIG. 6) while segments are present at positions C, D, E, and F to indicate a binary 1. A notch is present at position C for plate 96 while segments are present at positions B, D, E, and F to represent a binary 2. The positions A-F shown for plate 94 are utilized for the coding associated with plates 96-114; however, they are not shown on the drawing in order to simplify it. The coding shown in FIG. 6 can be utilized for up to 31 plates when selecting up to 31 cassettes like 20, for example as shown by the numbers 12-31 to the right of the associated plates in FIG. 6.

The position sensor 72 (FIG. 1) also includes a light source such as infra red and an opposed, complementary light sensor for each of the positions A-F, and they are shown as light sources L-A, L-B (FIG. 5) and light sensors S-A, S-B for positions A and B respectively; light sources and light sensors are shown only for positions A and B in order to simplify the drawing.

Each of the plates 94-114 has a radius of curvature R as shown for plate 94 in FIG. 5 which enables the plate like 94 to pass between the light sources like L-A and L-B and the associated sensors S-A and S-B, for example. The plates 94-114 are attached conventionally to the underside of the rotor 28 as at area 116 (FIGS. 2 and 4) to rotate with the rotor 28 and pass between the light sources like L-A and the light sensors like S-A which remain stationary as the plates 94-114 pass therebetween. The plates 94-114 are positioned in spaced-relationship around the underside 116 of the rotor 28, with each such plate being referenced to an associated cassette 20 on the rotor.

Each of the plates 94-114 has a long segment A, as shown for plate 94 in FIG. 5, which is used to initiate the reading of the binary coding associated with each of these plates as shown in FIG. 6. When the long segment A of plate 94, for example, blocks the light of light source L-A to sensor S-A (when the rotor 28 is moving in the direction of arrow-60) the control unit 84 (FIG. 3) will initiate the reading of the sensors S-B and S-C, S-D, S-E and S-F (these last four sensors are not shown but are similar to S-B) to determine from the associated binary pattern (shown in FIG. 6) what particular cassette 20 is in a predetermined position or is positioned with reference to selection area 66 (FIG. 1) to be moved into the tape transport 70 if that particular cassette is the one which is to be selected. For example, a user of the apparatus 10 may enter upon the operator control unit 118 (FIG. 3) data for the particular cassette like 20 to be selected. In other systems, a computer network (not shown) may initiate the request of the control unit 84 instead of the operator control unit. The control unit 84 then energizes the motor 50 to rotate the rotor 28 in the direction of arrow 60 (FIG. 1) as previously explained so as to present the cassettes 20 successively to the selection area 66 for selection. As an example, the cassette 20-1 may be associated with the plate 94 (or position #1), the cassette 20-1' shown in dashed outline in FIG. 1 may be associated with plate 96 (or position #2 as shown in FIG. 6) etc. The location of the position sensor 72 (FIG. 1) may be adjustably positioned along an arc having the same radius of rotation as the rotor 28 so as to provide for any adjustment required in locating the cassettes 20 with reference to the selection area 66.

The position sensor 72 (FIGS. 1 and 3) routes the binary information from the light sensors like S-A, S-B in FIG. 5 to the control unit 84 (FIG. 3) which has the necessary logic circuitry therein to determine whether or not the cassette like 20 is the particular one to be selected and inserted into the tape transport 70 as previously described. If it is, the control unit 84 will reverse the current to the DC motor power unit 120 (and the motor 50) via the current sensing unit 122 shown in FIG. 3 and thereby move the selected cassette into the tape transport 70 as previously described. It should be noted that each cssette like 20, is positively driven into engagement with the tape transport 70. When the cassette 20 is seated in operative engagement with the tape transport 70, the current to the motor 50 will increase due to the fact that the motor meets increased opposition when the cassette is seated. The increased current is sensed by the current sensing unit 122 and therafter the control unit 84 will use this as a signal to shut off the current to the motor 50, leaving the cassette 20 in operative engagement with the tape transport 70 while the cassette 20 is played. DC driver 124 (to obtain the necessary amplification and voltage levels) and power supply 126 are provided in the circuit shown in FIG. 3. Because the circuit shown in FIG. 3 is conventional, it need not be described in any further detail.

The planar base 14 (FIG. 2) has a peripheral or cylindrical member 128 ("L"-shaped in cross section) upstanding therefrom to form a partial enclosure for the apparatus 10 as already discussed. This member 128 has a surface or flange 130 which supports the cylindrical cover 19. A suitable handle 132 is used to lift the cover 9 which is centered on a post 134 which is upstanding from the cylindrical base 12. The post 134 has a longitudinal axis which is coincident with the longitudinal axis 46 of the base 12.

FIG. 7 is a general schematic diagram, in perspective, of a second embodiment of the apparatus of this invention which is designated generally as 136. The apparatus 136 includes a stationary member 138 having a selection or an entrance area 140 therein which receives the cassettes 20 as previously explained in relation to FIGS. 1 and 2.

The cassettes like 20 (FIG. 7) are moved past the entrance area 140 by a moving means or mechanism 142. The mechanism 142 includes first and second endless members such as bicycle-like chains 144 and 146 which are spaced apart as shown. Chain 144 is supported by sprockets 148 and 150, and similarly, chain 146 is supported by sprockets 152 and 154. The sprockets 152 and 148 are fixed to the shaft 156 in spaced relation thereon to be rotatably driven thereby, and the shaft 156 is rotatably supported in the spaced stationary supports 158 (only one is shown in FIG. 7). The sprockets 150 and 154 are rotatably mounted on a rod 160 which is secured in the stationary supports 162 and 164.The sprockets 154 and 150 are maintained in spaced parallel relationship by suitable locking collars (not shown) on each side of these sprockets. Each of the sprockets 148, 150, 152, and 154 has identical teeth 166 to mate with the associated chains 144 and 146 shown in more detail in FIG. 9.

The shaft 156 (FIG. 7) is operatively coupled to the rotor 168 of the motor 170 by a conventional coupling means which may be any conventional pulley and belt system, for example, or a coupling member 172, as shown. The motor 170 is a reversible DC motor which is driven by the power unit 120 shown in FIG. 3. When the current to the motor 170 flows in one direction, the sprockets 148 and 152 will drive the chains 144 and 146 in the direction of arrow 174, and when the current to the motor 170 is reversed, the chains 144 and 146 will be driven in the opposite direction.

Each of the cassettes 20 (FIG. 7) is attached to the chains 144 and 146 by the attachment means 64 best shown in FIG. 9. The attachment means 64 may be conventional and has to be adapted to the particular cassette 20 being used. For example, the cassette 20 used in this invention is a SCOTCH TM brand data cartridge which is manufactured by the 3M Company. This cassette 20 (FIG. 9) has recesses 176 and 178 in opposed sides thereof and opposed shoulders 180 and 182 in a transparent cover plate 183 thereof which are utilized in securing the cassette 20 to the chains 144 and 146. Only a portion of cover plate 183 is shown on each side to show the locations of shoulders 180 and 182. Each attachment means 64 includes a clip 65 which has a planar area 184 which has an aperture in one end thereof to receive a rod 186 which also passes through the clip 65 of the other attachment means 64 which in this example is near the chain 146 in FIG. 9. Each clip 65 has first and second ears 188 and 190 which engage opposed sides of the cassette 20 when installed thereon, and also has a third ear 192 which engages a slope in the recess 176, for example, thereby engaging the cassette 20 on three sides. Each cassette 20 is also secured to the chains by links 194 and 196 which are pivotally joined to chains 144 and 146, respectively, by pins like pin 195 and pin 198, for example. Link 196 is angled as at 200 and has a hole in one end thereof through which the rod 186 passes. The angle on link 196 enables the cassettes 20 to freely pivot between the chains 144 and 146 when in the assembled relationship shown in FIG. 9.

Each cassette 20 (FIG. 9) is assembled to the chains 144 and 146 in the following manner. The rod 186 is inserted in a matching hole in link 196 and the rod 186 has a head 202 (not shown) thereon to retain the link 196 thereon. Thereafter a clip 65 is placed on the cassette 20 on the side near the recess 178 and the rod 186 is passed through the hole in the end of the clip 65. Another clip 65 is similarly placed on the cassette 20 and the rod 186 (near recess 176) and therafter a bushing 204 is placed on the rod 186 and secured thereto by a pin 206. The clip 65 near recess 178 is shown displaced from its assembled position so as to facilitate a showing of the attachment means 64. The other link 194 is then pivotally joined to the rod 186 and retained thereon by a suitable fastener (not shown), and then the remaining end of link 194 is pivotally joined to the chain 144 by a pin 195 which is similar to pin 198.

Figure 8A:
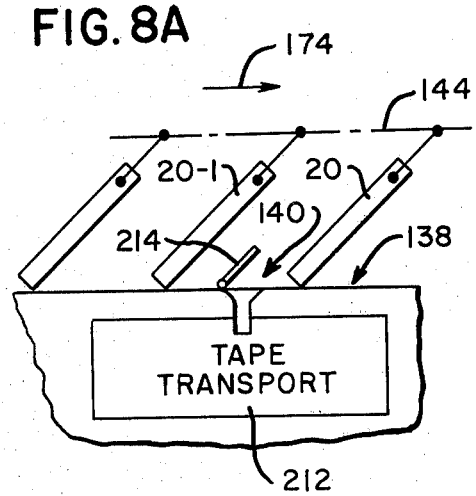
FIGS. 8A through 8F, when viewed in alphabetical sequence, provide a visual description of the general method of selecting an element according to this invention.
Figure 8D:
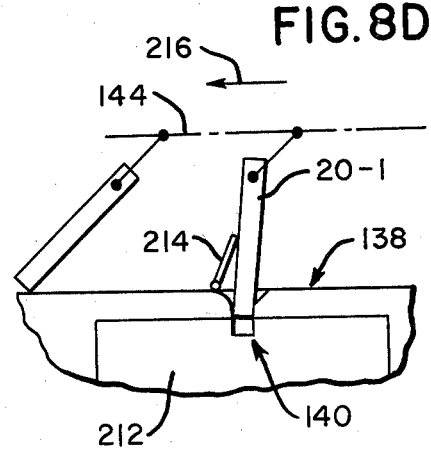
Figure 8B:
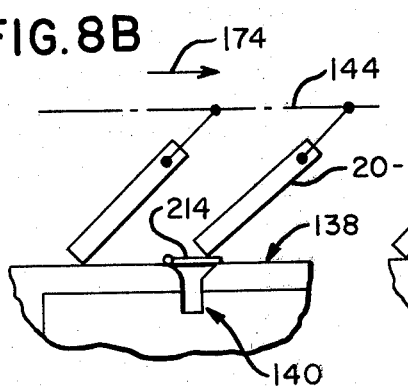
Figure 8E:
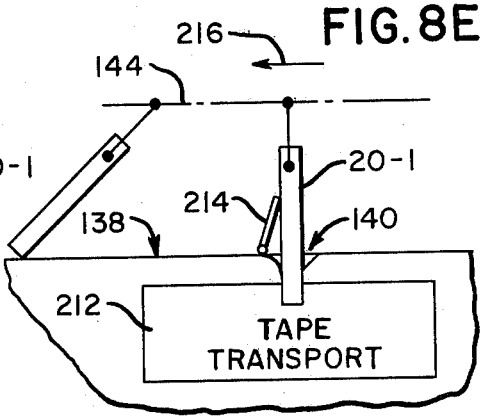
Figure 8C:
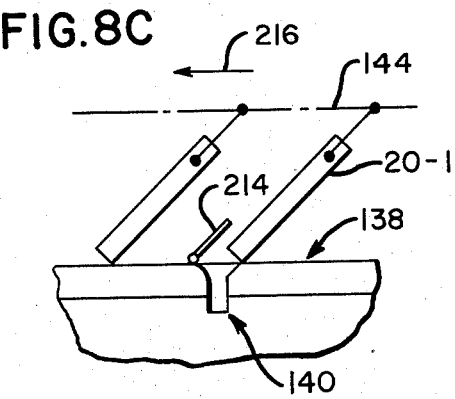

FIGS. 8A through 8F represent a schematic showing of how a cassette 20 to be selected is positively driven into the selected area 140 of the apparatus 136 and into the tape transport 212 shown in FIGS. 8A and 8E. The sequence of operations in FIGS. 8A through 8F is generally similar to that already described in relation to FIGS. 1 and 2. The apparatus 136 also includes a diverter gate 214 which is similar to and which functions in the same way as does the diverter gate 76 shown in FIG. 1. If cassette 20-1 in FIG. 8A is the cassette to be selected, it would be moved over the diverter gate 214 (FIG. 8B) and also moved past the entrance area 140 (FIG. 8C) and thereafter the current to motor 170 would be reversed due to the position sensor 218 in FIG. 7 coacting with the control unit 84 causing the chains 144 and 146 to move the cassette 20-1 in the direction of arrow 216 (FIG. 8C). The diverter gate 214 is resiliently biased to the open position shown in FIG. 8C causing the cassette 20-1 to be diverted into the entrance area 140 as previously described and positively moved down into the entrance area 140 (FIG. 8D) until it is in operative engagement with the tape transport 212 (FIG. 8E) as previously described. The tape transport 212 may be identical in design and operation to tape transport 70 (FIG. 1) already described.

Figure 10:
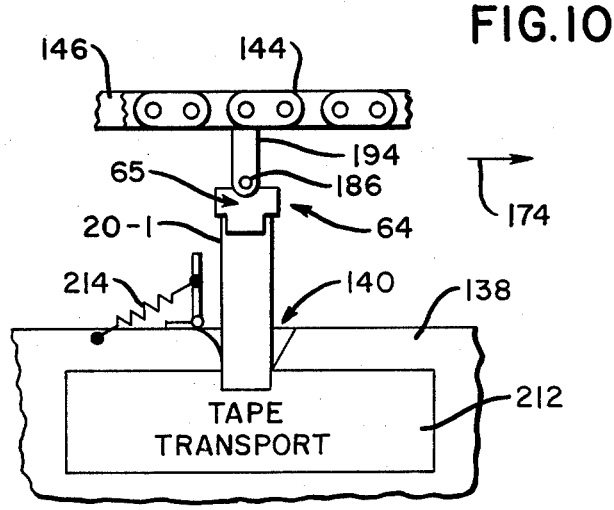
FIG. 10 (shown on the sheet containing FIGS. 4 and 5) is a general schematic side view, in elevation, showing the relationship of members associated with the attachment means when a cassette is in operative engagement with a tape transport.
Figure 8F:
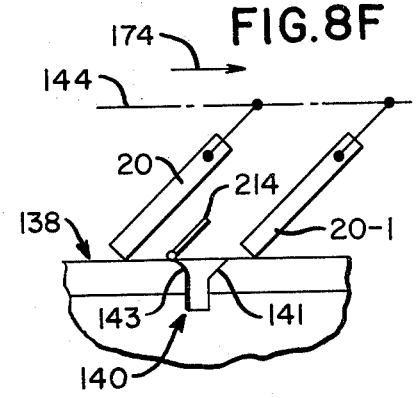

FIG. 10 shows the orientation of the chains 144 and 146, the links 194 and 196 with only link 194 being shown, and the clips 65 of the attachment means 64 when the cassette 20-1 is in operative engagement with the tape transport 212. When a user of the apparatus 136 is finished with the cassette 20-1, it is pulled out of the entrance area 140 by moving the chains 144 and 146 in the direction of arrow 174 as shown in FIG. 8F. The sides 141 and 143 of the entrance area 140 (FIG. 8F) are contoured or shaped conventionally to facilitate the entry and departure of the cassettes 20 from the entrance area 140.

The position sensor designated generally as 218 in FIG. 7 is substantially the same as the sensor 72 (FIG. 1) already described. The sensor 218 includes the plates such as plates 94–114 as shown in FIG. 6 with a plate 220 being shown in FIG. 7. There is one plate like 220 provided for each casssette 20 in the apparatus 136. The plates like 220 are conventionally and pivotally secured to the chain 144 to travel therewith and arcuate slots (not shown) may be used in the plates like 220 so as to enable them to travel around the sprockets 156 and 150. The plates like 220 are planar instead of being curved as plate 94 is for example as shown in FIG. 5; however, the coding employed in FIG. 6 is also used for the plates like 220 in FIG. 7. A source of light L-A and an associated sensor S-A are positioned in opposed relationship as previously explained. While the source of light L-A and its associated sensor are spaced apart considerably in FIG. 7 to simplify the drawing, they are actually positioned much closer together in the apparatus 136. The position sensor 218 may be positioned between the chain 144 and the path of the cassettes 20; in this regard, the width of the bushing 204 (FIG. 9) may be increased to accommodate the sources of light and their associated sensor like L-A and S-A, respectively or these sources of light and their associated sensors may be located on the "outside" of chain 144.

As the cassettes 20 are moved along the top of stationary member 138 (as viewed in FIG. 7) they assume the position shown, and as they move under the member 138 they may assume the position shown by cassette 20-2. The stationary member 138 has a flat upper planar surface 137 (FIG. 7) and a flat lower planar surface 139 which are joined by the cylindrically shaped sections 145 and 147. Adjustment of the tension of the chains 144 and 146 may be effected via the slots like 222 in the supports like 158 and 162 and fasteners (not shown) which pass through these slots to the base plate 224 shown in FIG. 7.

The drive electronics shown in FIG. 3 may be used with the apparatus 136 best shown in FIG. 7.

The clips 65 shown in FIG. 9 may be utilized to pivotally secure the cassettes 20 to the guides 62 in the apparatus 10 shown in FIG. 1. A suitable torsion spring (not shown) may be used with each clip 65 to resiliently bias the associated cassette 20 against the cylindrical wall 18 as previously explained.

I claim:

1. An apparatus for selecting one of a plurality of elements comprising:
    a means having an entrance area therein for receiving a selected one of said elements;

means for moving said plurality of elements in first and second directions with respect to said entrance area;

means for diverting a said element away from and into said entrance area when said element is moving respectively, in said first and second directions, with respect to said entrance area;

means for sensing which one of said plurality of elements is located at a predetermined position with respect to said entrance area, and control means responsive to said sensing means for controlling said moving means to move said plurality of elements in said second direction when a selected element is located at said predetermined location to thereby move said selected element into said entrance area.

2. The apparatus as claimed in claim 1 in which said means having said entrance area therein is cylindrical in shape and said moving means comprises a rotor having said plurality of elements thereon and drive means for rotating said rotor in said first and second directions.

3. The apparatus as claimed in claim 2 in which said diverting means comprises a diverter gate having one end pivotally joined to said means having said entrance area therein and also having a resilient means to bias said diverter gate to an open position with respect to said entrance area to divert a said selected element into said entrance area when said rotor is moving in said second direction.

4. The apparatus as claimed in claim 3 in which said sensing means comprises a unique coded member secured to said rotor for each said element of said plurality, and also comprises a means for reading said coded members for sensing which one of said plurality of elements is at said predetermined position.

5. The apparatus as claimed in claim 4 in which each said element is a data storage device and in which said apparatus further comprises a read/write means located with regard to said entrance area for receiving a said data storage device in reading/writing relationship therewith.

6. The apparatus as claimed in claim 5 in which said data storage device is a tape cassette.

7. The apparatus as claimed in claim 4 in which each said coded member has an identical portion thereon to enable said reading means to initiate the reading thereof, and each said coded member has additional portions present or absent in accordance with a predetermined code.

8. The apparatus as claimed in claim 2 in which said rotor is shaped generally as a torus and has a driving flange extending therefrom and in which said moving means further comprises a reversible motor operatively connected to said driving flange to move said rotor in said first and second directions.

9. The apparatus as claimed in claim 8 in which said moving means further comprises a plurality of rods upstanding from said rotor, with one said element being pivotally joined to each of said rods to enable the associated said element to be biased into said entrance area when said rotor is moving in said second direction.

10. The apparatus as claimed in claim 1 in which said means having said entrance area therein has a general planar surface, and said moving means comprises:

first and second endless members having said plurality of elements pivotally secured therebetween in spaced relationship along the length of said endless members;

and also comprises drive means for moving said first and second endless members in said first and second directions.

11. The apparatus as claimed in claim 10 in which said diverting means comprises a diverter gate having one end pivotally joined to said means having said entrance area therein and also having a resilient means to bias said diverter gate to an open position with respect to said entrance area to divert a said selected element into said entrance area.

12. The apparatus as claimed in claim 11 in which said sensing means comprises a unique coded member secured to one of said first and second endless members for each said element of said plurality, and also comprises means for reading said coded members for sensing which one of said plurality of elements is at said predetermined position.

13. The apparatus as claimed in claim 10 in which each said element is a data storage device and in which said apparatus further comprises a read/write means located with regard to said entrance area for receiving a said selected element in reading/writing relationship therewith.

14. The apparatus as claimed in claim 13 in which each said storage device is a magnetic tape cassette.

15. The apparatus as claimed in claim 14 in which said drive means further comprises first and second sprockets for mounting said first endless member thereon;

third and fourth sprockets for mounting said second endless member thereon;

and a reversible motor operatively coupled to said first and third sprockets for rotating them; and said first and second members being endless chains.

16. A method of selecting one of a plurality of elements comprising the steps of:
(a) mounting said plurality of elements in spaced relationship on a carrier;
(b) moving said carrier with said plurality of elements thereon in a first direction towards and past an entrance area;
(c) identifying which one of said elements is located at a predetermined location with reference to said entrance area;
(d) moving said carrier in a second direction opposite to said first direction when a selected element is identified as being at said predetermined location;
(e) deflecting said selected element into said entrance area.

17. The method as claimed in claim 16 in which said elements comprise data storage devices and said method further comprises the step (f) of moving said selected data storage device into operative engagement with an associated read/write device located in said entrance area.

18. A method of providing a data storage device comprising:
(a) storing data on a plurality of tape cassettes;
(b) mounting said plurality of cassettes in spaced relationship on a carrier;
(c) moving said carrier with said plurality of cassettes thereon in a first direction towards and past an entrance area;
(d) identifying which one of said cassettes is at a predetermined location with reference to said entrance area;
(e) moving said carrier in a second direction opposite to said first direction when a selected cassette is identified as being at said predetermined location;
(f) deflecting said selected cassette into said entrance area and moving said selected cassette into operative engagement with a read/write device located in said entrance area.

* * * * *